April 4, 1933.  M. ISAACSON  1,903,293
FLUID BRAKE
Filed Dec. 27, 1930  3 Sheets-Sheet 1
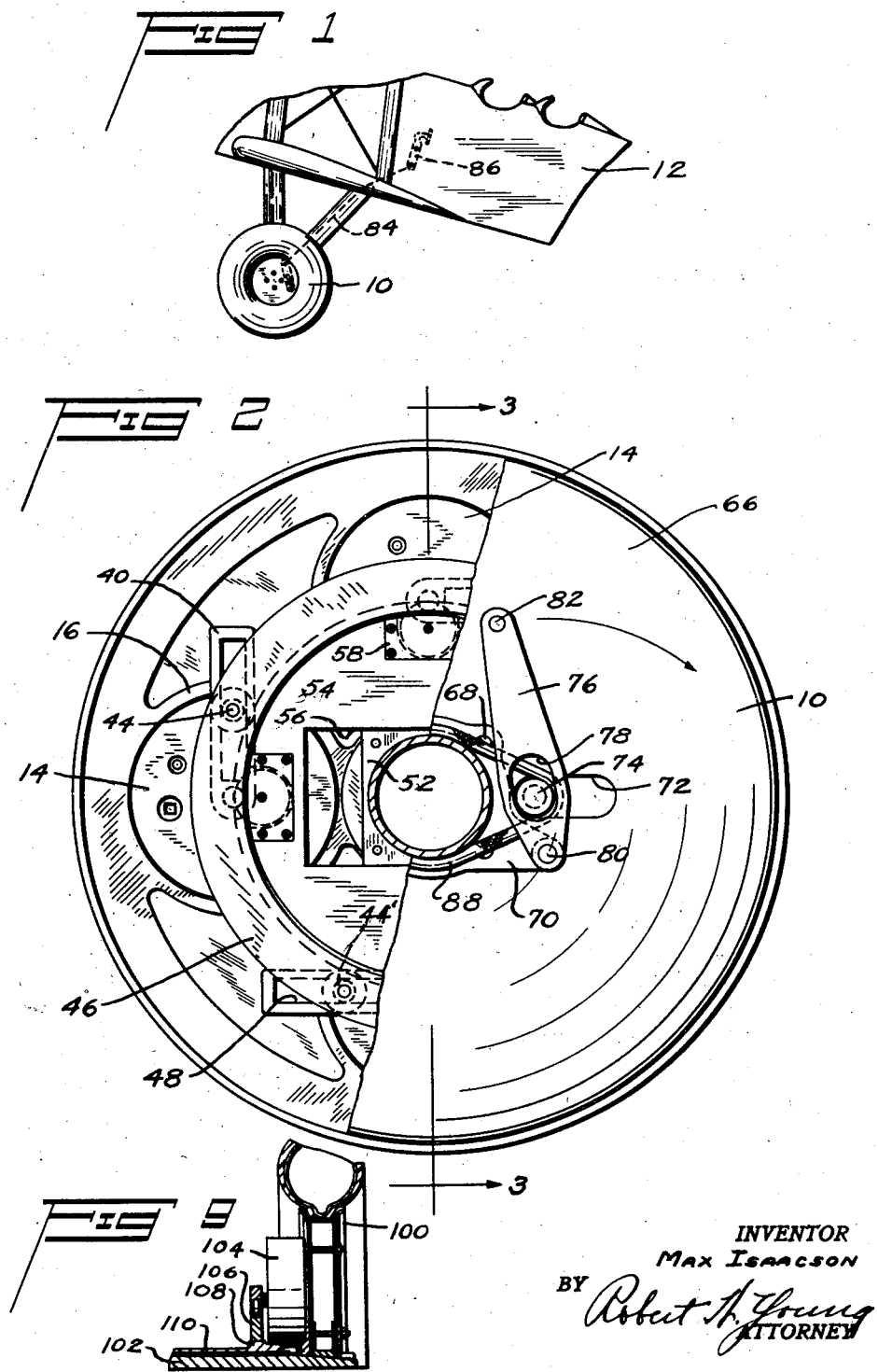

April 4, 1933.  M. ISAACSON  1,903,293
FLUID BRAKE
Filed Dec. 27, 1930    3 Sheets-Sheet 2
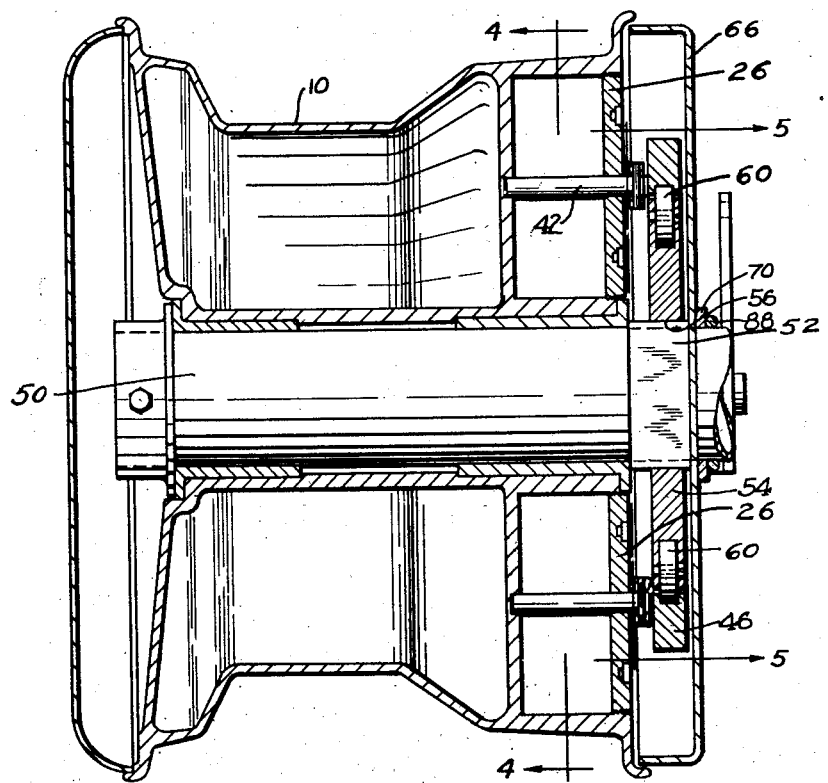
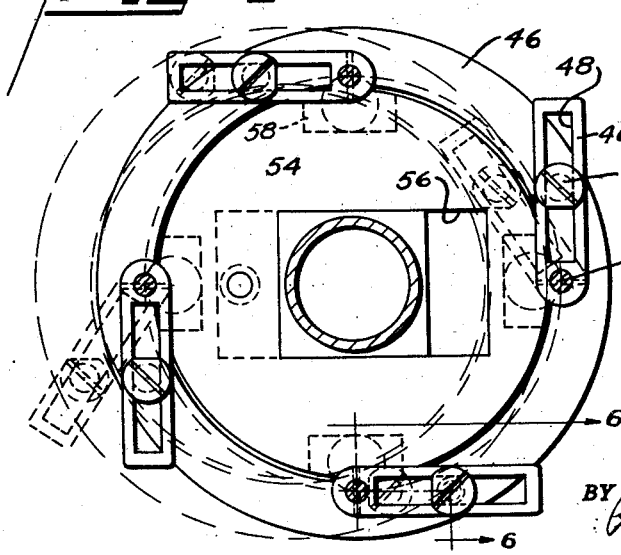
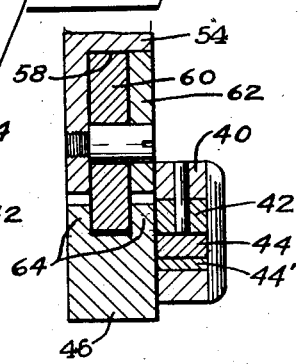
INVENTOR
Max Isaacson
BY
Robert H. Young
ATTORNEY April 4, 1933.  M. ISAACSON  1,903,293
FLUID BRAKE
Filed Dec. 27, 1930   3 Sheets-Sheet 3
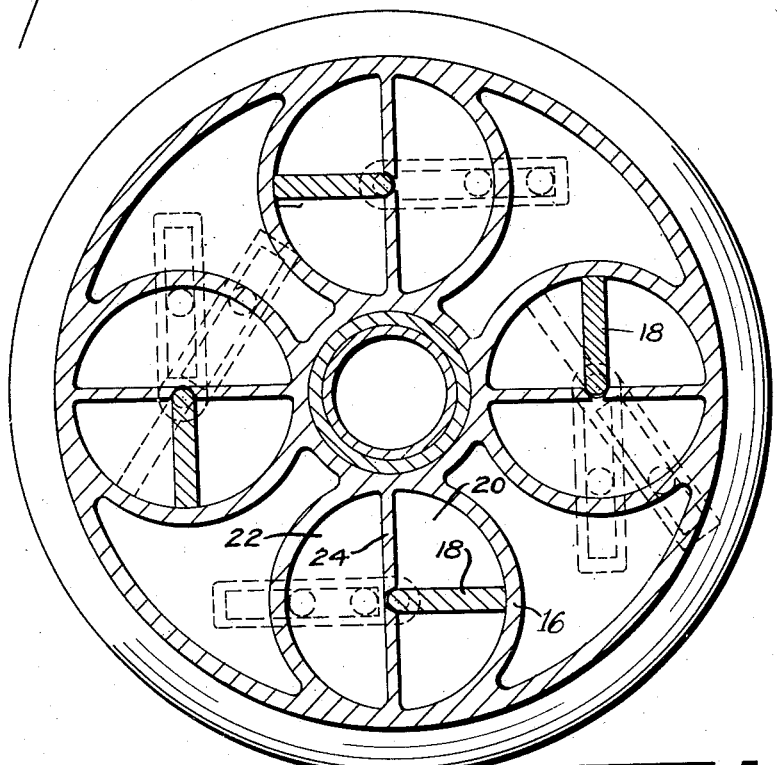
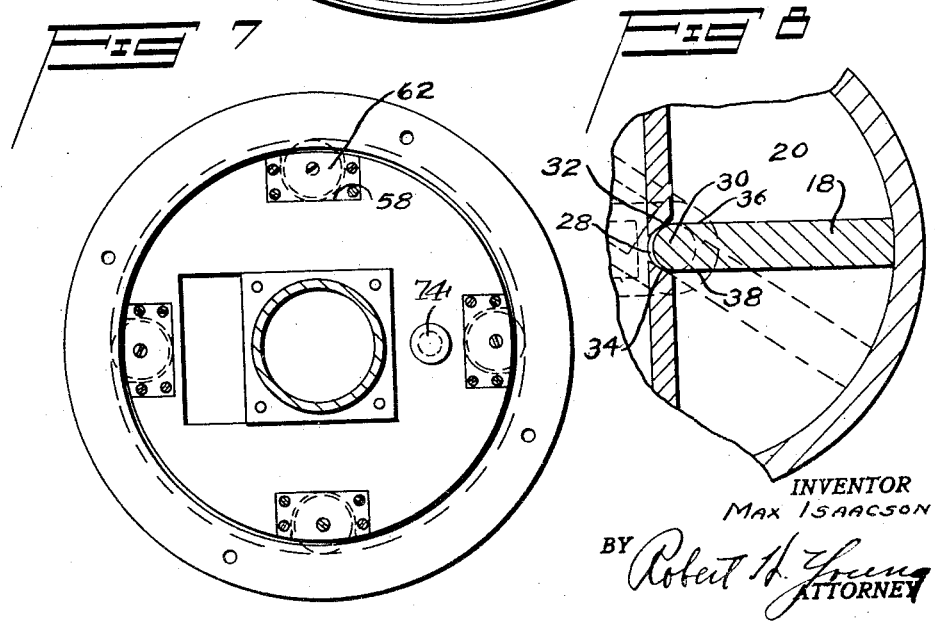
INVENTOR
MAX ISAACSON
BY Robert H. Green
ATTORNEY Patented Apr. 4, 1933

1,903,293

UNITED STATES PATENT OFFICE

MAX ISAACSON, OF DAYTON, OHIO

FLUID BRAKE

Application filed December 27, 1930. Serial No. 505,149.

(GRANTED UNDER THE ACT OF MARCH 3, 1883, AS AMENDED APRIL 30, 1928; 370 O. G. 757)

The invention described herein may be manufactured and used by or for the Government for governmental purposes without the payment to me of any royalty thereon.

This invention relates in general to vehicle wheel brakes and is particularly adaptable for the braking of the undercarriage or on wheels of airplanes and like aircraft.

This invention consists in providing improved means for this purpose such that the braking is obtained by absorbing energy through resistance to pumping of fluid due to the rotation of the wheel; the pumping action being controlled at the will of the pilot or operator, and such that when no braking is desired the rotation of the wheel will not effect a pumping action.

In one form of the invention, the piston or impeller of an oil pump, which revolves as one with the undercarriage wheel, is adapted to be reciprocated, at will, in the oil containing cylinder or casing by means of manually controlled mechanism, such as a shifting eccentric slidably mounted on a shaft or axle, and connected through suitable linkage to the impeller in such manner that when the shifting eccentric is in normal or inoperative position the wheel, pump and linkage revolve as a unit about the axle without effecting a pump action, but when the eccentric is displaced relative to the axle and the wheel is rotated, the reciprocation of the impeller takes place, the speed of the reciprocation depending upon the speed of the rotation of the wheel and the amplitude thereof depending upon the extent of the relative movement of the eccentric and axle. The liquid contained in the pump is forced by the impeller through a metered orifice or passage and the resistance offered by the liquid to the reciprocating travel of the impeller is thus transmitted through the linkage to the wheel for retarding its rotation. By completely restricting the passage at the point substantially where the impeller is required to move to correspond with the predetermined maximum braking effect the rotation of the wheel may be checked and the wheel locked in place.

Referring to the drawings accompanying the application:

Fig. 1 is a fragmentary elevational view of an airplane showing a landing gear to which my novel brake is applied;

Fig. 2 is an inside view of the right wheel of the landing gear with the cover plate broken away to show the assembled relation of the braking mechanism;

Fig. 3 is a vertical sectional view taken on the line 3—3 of Fig. 2;

Fig. 4 is a sectional view taken on the line 4—4 of Fig. 3 and showing part of the operating mechanism for the impellers in dotted outline;

Fig. 5 is a sectional view taken on the line 5—5 of Fig. 3 and showing the operative extreme position of the impeller operating mechanism in dotted lines;

Fig. 6 is a detail view taken on the line 6—6 of Fig. 5;

Fig. 7 is a view looking from the rear of Fig. 5, certain of the parts being removed;

Fig. 8 is a fragmentary detail view; and

Fig. 9 is a sectional view showing my invention as applied to the rear wheel of an automobile.

Like references are used throughout the drawings to designate like parts.

In the construction shown in the drawings, for purposes of illustration, the wheel 10 forming a part of the landing gear of the airplane 12 in Fig. 1, is provided with four pumps 14 that are bodily rotatable with it as a unit and are radially positioned with respect to a common center or axis in an area substantially the same or less than that circumscribed by the usual wheel brake drum. Each pump 14 constitutes a means for absorbing energy through the resistance to pumping of fluid and the number of pumps required will depend upon a predetermined maximum braking effect desired for a given load and speed of the vehicle. All of the pumps are identical in construction and function alike, each consisting of a stationary casing 16 and a movable piston or impeller 18. Each casing is preferably made integral with the wheel and is constructed with two chambers 20 and 22 that are separated by a partition or transversely disposed wall 24. These chambers are filled with a suitable fluid, preferably a free-flowing liquid, a cover plate 26 serving to tightly close the casing. Within the chamber 20 is mounted the impeller 18 which preferably is of the single blade type and operates only in one of the chambers, but forces the fluid through both chambers by means of a channel or passage 28, in the form of gradually tapering recess formed on the hub 30 of the impeller at its periphery. As the impeller travels toward the extreme ends of its stroke in both directions, the passage 28 gradually decreases thereby increasing the resistance to the movement of the impeller. The passage or grooves may be so designed that the ends 32 and 34 thereof come in contact with the faces 36 and 38 respectively when the impeller has approached the point where it is slightly in advance of the position which corresponds to the maximum travel for the predetermined maximum braking effect.

Appropriate means are provided for operatively connecting the energy absorbing pumps to each other, and, as best shown in Figs. 2, 5 and 6, consist of four slotted arms 40, each arm being connected to the spindle 42 of its respective impeller and operated by a pin 44 in threaded engagement with the face of a ring or strap 46 that is normally positioned concentric with the axis of the wheel and is revolvable therewith. The pins 44 are equidistantly spaced apart on a circle concentric with the axis of the strap 46 and in their normal positions are disposed midway of the slots 48 of their respective arms disposed on each of the pins 44 and between the slots 48 are bearing sleeves 44' best shown in Figure 6.

The wheel 10 is rotatably mounted on an axle 50 that is provided with a squared portion 52 at a point laterally of the wheel and in the plane of the ring member 46. Slidably mounted on this squared portion for radial movement with respect to the axle is a member 54 that is formed with an opening 56 to receive the squared portion and is of such longitudinal dimension as to permit the shifting thereof to the maximum eccentric position, as shown in dotted lines in Fig. 5, required for the predetermined maximum movement of the blade 18. The member 54 is provided with four equally spaced shouldered recesss 58 at the peripheral edge thereof to receive four rollers 60 that are journaled in the recesses and retained in place by plates 62, as best shown in Figs. 6 and 7. Each roller has a portion of its rim projecting beyond the peripheral edge of the member 54 and is received between a pair of guides 64 formed on the inner peripheral edge of the ring 46. In assembling the ring 46 and member 54, the rollers must first be inserted between the guides 64. A cover plate 66 of conventional construction for completely enclosing the brake mechanism is mounted on the axle and is held against rotation by means of screws 68 passing through a bracket 70 and threaded to the squared portion 52. The cover plate is provided with a horizontal slot 72 to receive an operating pin 74 that is rigidly secured to the member 54 and is adapted to be moved longitudinally of the slot by a lever 76, to which it is connected through a slot 78 therein. Both slots 72 and 78 are of such dimensions as not to restrict the permissible movement of the member 54 on the squared portion. The lever 76 has one end 80 connected to the bracket 70 and its other end 82 to a cable 84, that is operated by a foot pedal 86, shown in dotted lines on Fig. 1. While it is believed that when there is no braking application, the member 54 and ring member 46 will tend to center themselves with respect to the axis, spring means is nevertheless provided to insure this function and accordingly an endless shock cord 88 is passed around the axle 50 and the pin 74 to cause the shiftable eccentric mechanism to be returned toward central position as the operator releases the brakes.

Fig. 9 shows my invention as applied to the rear wheel 100 of an automobile. In this embodiment the wheel is rotatable with the axle 102 and has mounted thereon the energy absorbing means, which consists, as hereinbefore stated, of a plurality of pumps 104 that are actuated in the manner above described. These pumps are preferably detachably connected to the wheel. The manually actuated eccentric member 106 for controlling the fluid acting pumps, is slidably mounted on a squared portion 108 of the axle housing 110.

The operation of my improved brake mechanism is as follows:

Assuming the operator to have moved the pedal 86 for effecting a braking action, the eccentric member 54 will have been shifted from its normal position of concentricity with the axle of the wheel against the tension of the shock cord 88 to an eccentric position and with it the ring member 46 to thereby effect, through the slotted links 40 and pins 44, a variable oscillating movement of the impellers, the extent of this movement depending upon the eccentricity of the shiftable eccentric and the resistance of this movement depending upon the quantity of fluid to be forced through the passages, which of course is a function of the rate of rotation of the wheel. Since the pumping action or reciprocating movement of the impellers is in proportion to the speed of rotation of the wheel, the degree of braking application for any given eccentricity of the eccentric member will be correspondingly lessened as the rotation of the wheel is retarded and it will, therefore, be necessary to increase the eccentricity to maintain the degree of braking desired. By arranging the passages so that they taper toward the extreme end of the strokes of the impellers the retarding effect becomes progressively greater and greater for every increment of movement as the eccentric member is moved toward its extreme eccentric position, whence the passage is closed and the wheel is locked; as the eccentric is returned toward its normal position, the braking effects, for similar increments of movement, are correspondingly progressively lessened until the eccentric reaches its normal position, whence there is no braking effect.

Having now particularly disclosed the action of my invention and described what I consider to be the best mode of applying the principle thereof, it is to be understood that I do not intend to be limited to the precise details of construction and arrangement of the parts herein shown and described, as various changes may be made by those skilled in the art without departing from the spirit of my invention.

What I claim as new and desire to secure by Letters Patent is:

1. A brake adapted for a vehicle wheel supported on an axle, comprising fluid actuating means for dissipating energy bodily rotatable with said wheel, said actuating means including impeller means and an orifice and control means transversely movable relative to said axle for causing said first mentioned means to be actuated at a linear speed in accordance with the speed of rotation of the wheel and the extent of movement of the control means relative to said axle for retarding the rotation of said wheel, said orifice having the same cross-sectional area for like positions of said impeller means for any setting of said control means.

2. A brake adapted for a vehicle wheel supported on an axle comprising a plurality of fluid actuating devices bodily rotatable with said wheel, each of said devices including an impeller, and a metering orifice associated therewith for dissipating energy, and eccentric mechanism transversely shiftable relative to said axle for controlling the quantity of fluid actuated due to the rotational speed of said wheel and the degree of eccentricity of said mechanism relative to said axle to thereby retard the rotation of said wheel, each of said orifices having the same cross-sectional area for like positions of its respective impeller for any setting of said control means.

3. A brake adapted for a vehicle wheel supported on an axle comprising a plurality of independently operated fluid actuating devices bodily rotatable with said wheel, each of said devices including an impeller and a metering orifice associated therewith for dissipating energy, and a manually operable member movable transversely relative to said axle for controlling the quantity of fluid actuated by the rotational speed of said wheel and the extent of movement of said member relative to said axle to thereby retard the rotation of said wheel, said orifices having equivalent cross-sectional areas for like positions of their respective impellers for any setting of said control means.

4. A brake adapted for a vehicle wheel supported on an axle, comprising a fluid casing having a movable impeller therein for actuating the fluid and a metering means associated therewith for regulating the fluid flow, an actuating member for said impeller, said casing, impeller, metering means and actuating member being bodily rotatable with said wheel and freely about said axle, and means in engagement with said actuating member and transversely movable relative to the axle for controlling the stroke of said impeller and for causing said impeller to be actuated at a speed proportional to the rate of rotation of said wheel and to the extent of movement of said control means and in accordance with a predetermined control of fluid flow for every like operative position of said impeller for any setting of said control means thereby retard the rotation of said wheel.

5. A brake for a vehicle wheel supported on an axle, comprising a fluid casing having an impeller movable therein about an axis fixed relative to said casing for actuating the fluid, a ring member connected to said impeller, said casing, impeller and ring member being bodily rotatable with said wheel and freely about said axle, a shiftable eccentric normally concentrically mounted on said axle and in engagement with said ring member and manually operable means for shifting said eccentric from its normal position transversely of said axle to cause a reciprocation of said impeller within said casing by the rotation of said wheel to actuate the fluid and thereby retard the rotation of said wheel.

6. A brake for a vehicle wheel supported on an axle, comprising a plurality of independent fluid actuating devices including fluid containing cylinders, radially positioned about a common center and bodily rotatable with said wheel, each cylinder having an impeller movable therein about an axis fixed relative to said cylinder for actuating the fluid and metering means associated therewith to thereby dissipate energy, a common actuating member for each of said impellers, a member slidably connected to said axle for controlling the actuation of fluid due to the rotation of said wheel, and antifriction means interposed between said common actuating member and said slidable member.

7. A brake adapted for a vehicle wheel, comprising fluid actuating means bodily rotatable with said wheel for absorbing energy due to fluid flow resistance, means operable independently of the rotation of said wheel for regulating said first mentioned means and for causing the same to actuate quantities of fluid in accordance with the speed of rotation of said wheel and the degree of regulation and fluid metering means cooperating with said fluid actuating means and said regulating means to obtain a varying degree of said fluid flow resistance in accordance with a predetermined setting of said regulating means.

8. A brake adapted for a vehicle wheel comprising a fluid casing having an impeller therein for actuating the fluid, said casing and impeller being bodily rotatable with said wheel and said impeller being movable about an axis fixed with respect to said casing, means operable independently of the rotation of said wheel for regulating the speed of said impeller to actuate quantities of fluid in accordance with the speed of rotation of said wheel and the extent of movement of said regulating means and fluid metering means cooperating with said control means and said impeller to retard the flow of fluid in accordance with the braking desired.

9. In combination an axle, a vehicle wheel rotatably mounted on said axle fluid actuating means for dissipating energy by forcing fluid through a varying restricted opening, cooperating with and adapted to be actuated at will by the rotation of said wheel for retarding said rotation and control means cooperating with said axle and said actuating means for regulating the actuating means and for causing the same to actuate quantities of fluid in accordance with the speed of the wheel and in accordance with a predetermined varying rate of fluid flow through said opening.

10. The combination with a vehicle wheel, supported on an axle and fixed against transverse movement relative thereto; of fluid actuating means comprising a casing and a reciprocating impeller for forcing fluid through a restricted opening to thereby dissipate energy and retard the rotation of said wheel, said fluid actuating means being bodily rotatable with said wheel and normally inoperative, and manually operated means movable relative to said axle for controlling the actuation of fluid by said actuating means in accordance with the rotation of said wheel and in accordance with the flow of fluid through a predetermined cross-sectional area of said opening, said cross-sectional area being the same for like operative positions of said impeller for different settings of said manual means.

11. In combination with a vehicle wheel mounted on an axle of fluid actuating mechanism comprising a casing and an impeller for actuating said fluid through a restricted orifice of varying cross-sectional area to thereby dissipate energy, and manually operated means for causing at will said impeller to be actuated by the rotation of said wheel to actuate said fluid through said orifice in accordance with a predetermined manual setting of said impeller.

12. The combination with a wheel supported on an axle; of fluid actuating means for dissipating energy due to resistance of fluid flow rotatably movable with said wheel and normally inoperative, control means for causing the actuation of the fluid in said energy dissipating means due to the rotation of said wheel for retarding said rotation, and fluid metering means cooperating with said control means for effecting a varying rate of fluid flow in accordance with a predetermined setting of said control means.

13. The combination with a shaft having a vehicle wheel rotatably mounted thereon and fluid actuating means for dissipating energy carried bodily by said wheel and disposed radially with respect to the axis thereof, said fluid actuating means including a casing and an impeller movable about an axis fixed relative to axis of said casing of means carried by said shaft to control the actuation of said energy dissipating means and cooperating therewith such that in normal position the wheel and energy absorbing means are free to move relative to the shaft, an anti-friction means interposed between said first-mentioned means and said second-mentioned means.

14. The combination with a shaft having a wheel mounted thereon, said wheel and shaft being fixed against relative translatory movement and fluid actuating mechanism including a plurality of independent fluid casings, each casing having an impeller and an orifice provided therein and through which fluid is actuated by said impeller for dissipating energy carried by said wheel, of a manually operable member slidably connected to said shaft for controlling the actuation of said impellers and cooperating therewith such that a relative movement of said shaft and member from normal position will cause each of said impellers to be actuated by the rotation of said wheel.

15. The combination with a shaft having a wheel mounted thereon, said wheel and shaft being fixed against relative translatory movement and fluid actuating mechanism including a plurality of independent fluid casings carried by said wheel, each casing being provided with an impeller and an orifice through which fluid is actuated for dissipating energy; of a manually operable member normally concentrically positioned with respect to the axis of said shaft and slidably movable thereon for controlling the actuation of said impellers and cooperating therewith such that a relative movement of said shaft and member from normal position will cause the fluid in each of said casings to be actuated according to the rate of rotation of said wheel and the extent of excentricity of said manually operable member for retarding said rotation.

16. The combination with a shaft having a wheel mounted thereon, said wheel and shaft being fixed against relative translatory movement, fluid actuating means for dissipating energy carried by said wheel, said means comprising a relatively stationary casing radially disposed relative to the axis of said wheel and having a movable impeller and an orifice, and a normally inoperative actuating element adapted to cause said impeller to be reciprocated by the rotation of the wheel and thereby actuate quantities of fluid in accordance with the speed thereof and the relative movement of said element and said shaft.

17. The combination with a shaft having a wheel mounted thereon, said wheel and axle being fixed against relative translatory movement fluid actuating mechanism for dissipating energy carried by said wheel, said mechanism comprising a relatively stationary casing and a movable impeller, and a ring member operatively connected to said impeller and rotatable with said wheel, of a manually operated control member slidably mounted on said shaft and normally coaxial with said shaft and with said ring member, said wheel and axle and their respectively carried parts being so disposed as to permit said wheel to rotate freely about said shaft in the normal position of said control member and manual means to operate said control member to cause the fluid to be actuated by said impeller due to the rotation of said wheel and thereby retard the rotation thereof.

18. Hydraulic means for retarding the rotation of an object supported against transverse movement on a shaft, comprising a plurality of fluid casings, radially disposed relative to the axis of rotation of said object and rotatable therewith, an adjustable impeller for each of said casings and means cooperating with each of said impellers for actuating said fluid in accordance with a predetermined control of fluid flow for every like relative operative position of said impeller and casing of each of said impellers and casings for any adjustment of said impellers to thereby resist the rotation of said object, and further means to prevent said fluid actuation to thereby lock said wheel against rotation.

19. Hydraulic means for retarding the rotation of an object supported against transverse movement on a shaft, comprising a plurality of fluid casings, radially disposed relative to the axis of rotation of said object and rotatable therewith, an adjustable impeller for each of said casings and means cooperating with each of said impellers for effecting a varying metering of said fluid to thereby resist the rotation of said object.

20. Hydraulic means for retarding the rotation of an object supported against transverse movement on a shaft, comprising a plurality of fluid casings, radially disposed relative to the axis of rotation of said object and rotatable therewith, each casing having impeller means manually inoperative and means mounted on said shaft for causing said impeller means to be actuated by the rotation of said object and cause the fluid in each of said casings to flow through a restricted orifice to resist the rotation of said object.

21. Hydraulic means for retarding the rotation of an object supported against transverse movement on a shaft, comprising a plurality of fluid casings, radially disposed relative to the axis of rotation of said object and rotatable therewith, each casing having an adjustable impeller movable about an axis relatively fixed with respect to first-mentioned axis and means for causing said impeller to be actuated by the rotation of said object to thereby actuate said fluid through a restricted opening that is rotatable during the operation of said impeller in accordance with a given adjustment thereof.

22. Hydraulic means for retarding the rotation of an object supported against transverse movement on a shaft, comprising a plurality of independently operated fluid actuating devices including a like plurality of fluid casings, radially disposed relative to the axis of rotation of said object and rotatable therewith, each casing having impeller means, means for causing said impeller means to be actuated by the rotation of said object to thereby actuate said fluid through a restricted opening of predetermined cross-sectional area, and means for regulating the extent of movement of said impeller means without varying the cross-sectional area of said opening for like operative positions of each impeller means for different adjustments thereof.

23. Hydraulic means for retarding the rotation of an object supported against transverse movement on a shaft, comprising a plurality of fluid casings, radially disposed relative to the axis of rotation of said object and rotatable therewith, each casing having impeller means, means for causing said impeller means to be actuated by the rotation of said object to thereby actuate said fluid through a restricted opening, and means for regulating the extent of movement of said impeller means, said impeller means cooperating with said restricted opening for regulating this fluid flow in accordance with a predetermined setting of said regulating means.

In testimony whereof I affix my signature.

MAX ISAACSON.